US009591611B2

(12) United States Patent
Hwang et al.

(10) Patent No.: US 9,591,611 B2
(45) Date of Patent: Mar. 7, 2017

(54) APPARATUS AND METHOD FOR PROVIDING INTERACTION SERVICE FOR KIDS, SYSTEM USING THE SAME

(71) Applicant: SK PLANET CO., LTD, Seoul (KR)

(72) Inventors: Sil Keun Hwang, Geoji-si (KR); Kwang Min Seo, Seoul (KR)

(73) Assignee: SK PLANET CO., LTD., Seongnam-si, Gyeonggi-do (KR)

( * ) Notice: Subject to any disclaimer, the term of this patent is extended or adjusted under 35 U.S.C. 154(b) by 331 days.

(21) Appl. No.: 14/239,392

(22) PCT Filed: Apr. 1, 2013

(86) PCT No.: PCT/KR2013/002670
§ 371 (c)(1),
(2) Date: Feb. 18, 2014

(87) PCT Pub. No.: WO2014/119818
PCT Pub. Date: Aug. 7, 2014

(65) Prior Publication Data
US 2016/0142997 A1 May 19, 2016

(30) Foreign Application Priority Data
Jan. 30, 2013 (KR) ........................ 10-2013-0010249

(51) Int. Cl.
H04W 68/00 (2009.01)
G06Q 10/10 (2012.01)
(Continued)

(52) U.S. Cl.
CPC .......... H04W 68/005 (2013.01); G06Q 10/10 (2013.01); H04B 5/0031 (2013.01);
(Continued)

(58) Field of Classification Search
CPC ..... H04W 68/005; G06Q 10/00; G06Q 30/06; H04M 1/7253
See application file for complete search history.

(56) References Cited

U.S. PATENT DOCUMENTS 7,684,548 B1 3/2010 Rodkey et al.
2004/0204950 A1* 10/2004 Vlahos ................. G06Q 30/06
705/15
(Continued)

FOREIGN PATENT DOCUMENTS

CN 1767521 A 5/2006
CN 101052157 A 10/2007
(Continued)

OTHER PUBLICATIONS

Chinese Office Action for corresponding Chinese Application No. 201380025987.6 dated Jun. 15, 2015.
(Continued)

Primary Examiner — Myron K Wyche
(74) Attorney, Agent, or Firm — Hauptman Ham, LLP

(57) ABSTRACT

Disclosed are an apparatus and a method for providing an interaction service for children, which give a real-time alarm related to notification details about a child, who goes to a children's educational institution such as a kindergarten or a child-care center, to a teacher and a parent and thereby enable the teacher and the parent to share information and comprehensively take care of the child, and a system using the same. When the teacher enters and transmits a notification message after the teacher uses a terminal to tag an NFC card which a child carries, an interaction service providing apparatus receives the notification message, attaches a connection address of each social commerce site associated with a particular word of the notification message to a partial area of the notification message, and transmits the notification (Continued)

message to which the connection address is attached, to the parent.

16 Claims, 8 Drawing Sheets

(51) Int. Cl.
*H04L 12/58* (2006.01)
*H04B 5/00* (2006.01)
*H04L 29/08* (2006.01)
*H04W 4/00* (2009.01)
*G06Q 50/20* (2012.01)

(52) U.S. Cl.
CPC ............ *H04L 51/046* (2013.01); *H04L 67/02* (2013.01); *H04W 4/008* (2013.01); *G06Q 50/20* (2013.01)

(56) References Cited

U.S. PATENT DOCUMENTS

| | | | | |
|---|---|---|---|---|
| 2007/0229217 | A1* | 10/2007 | Chen | G06Q 10/00 340/5.61 |
| 2011/0165859 | A1* | 7/2011 | Wengrovitz | H04M 1/7253 455/411 |

FOREIGN PATENT DOCUMENTS

| | | |
|---|---|---|
| JP | 2001-14398 A | 1/2001 |
| JP | 2003-196360 A | 7/2003 |
| JP | 2004-70780 A | 3/2004 |
| JP | 2004-118548 A | 4/2004 |
| JP | 2009-9421 A | 1/2009 |
| JP | 2009-59329 A | 3/2009 |
| JP | 2011-54003 A | 3/2011 |
| KR | 1020060078627 A | 7/2006 |
| KR | 1020100088402 A | 8/2010 |
| KR | 1020100125070 A | 11/2010 |
| KR | 1020130002147 A | 1/2013 |
| KR | 1020130010249 | 1/2013 |

OTHER PUBLICATIONS

Korean Office Action dated Sep. 5, 2013 for application No. 10-2013-0010249.
Korean Notice of Allowance dated Oct. 30, 2013 for application No. 10-2013-0010249.
Japanese Office Action dated Feb. 19, 2015 for application No. 2014-559840.
Extended European Search Report dated Sep. 6, 2016 in connection with the counterpart European Patent Application No. 13873864.6-1862.

\* cited by examiner

APPARATUS AND METHOD FOR PROVIDING INTERACTION SERVICE FOR KIDS, SYSTEM USING THE SAME

BACKGROUND OF THE DISCLOSURE

1. Field of the disclosure

The present disclosure relates to an interaction service for children, and more particularly, to an apparatus and a method for providing an interaction service for children, which give a real-time alarm related to notification details about a child, who goes to a kindergarten or a child-care center, to a teacher and a parent and thereby enable the teacher and the parent to share information and comprehensively take care of the child, and a system using the same.

2. Description of the Prior Art

Typically, educational institutions (e.g., kindergartens) for children or child-care institutions (e.g., child-care centers) have a great interest in effectively managing children who go to the educational institutions for them or whom the child-care institutions take care of. However, young children wander about following their curiosities regardless of the intentions of parents or teachers. Accordingly, when parents or teachers fail to continuously take care of young children with interset, an accident often happens, or a child often goes missing.

Particularly, nowadays, when parents are employed, they leave their young children in child-care institutions, so that child care teachers of child-care institutions take care of the young children while their parents work. When one child care teacher takes charge of several young children, the child care teacher has difficulty in comprehensively taking care of the young children due to characteristics of the young children such that they are not accustomed to express their states or desires.

For example, when a child in a child-care institution was prescribed a medicine and is in a state of taking the medicine, if the child's parent fills out a document for administering the medicine to the child and sends the document to a child care teacher by the hand of the child together with the medicine, until the child returns home from the child-care institution, the child's parent cannot know whether the child care teacher identified the document, whether the child took the medicine, and how much lunch the child had when the child has no appetite. Also, after the child returns home from the child-care institution, when there is something that the child's parent is anxious to know and desires to ask of the child care teacher beyond what the child care teacher wrote in a note, the child's parent must wait a long time until the child's parent receives an answer when the child's parent asks questions of the child care teacher through a memo. Even when the child's parent asks the questions of the child care teacher during conversation on the telephone, the child care teacher may have difficulty in remembering specific details about the child in terms of a situation in which the child care teacher must take care of several children. Accordingly, the child's parent may not get a proper answer.

As described above, a teacher and a parent need to share information on special details about a child in real time.

SUMMARY OF THE DISCLOSURE

Accordingly, the present disclosure has been made to solve the above-mentioned problems occurring in the prior art, and an object of the present disclosure is to provide an apparatus and a method for providing a smart interaction service, which enable a teacher and a parent to share information on special details about a child in real time, and a system using the same.

Another object of the present disclosure is to provide an interaction service capable of associating a preparation material with social commerce.

In order to accomplish these objects, in accordance with a first aspect of the present disclosure, there is provided an interaction service system for children, which includes: a teacher terminal configured to acquire identification information of each child by reading a Near Field Communication (NFC) tag which each child carries, receive a notification message as an input, store the received notification message in association with the identification information of each child, and request transmission of the notification message; a parent terminal configured to receive the notification message and display the received notification message; and an interaction service providing apparatus configured to receive the identification information of each child and the notification message from the teacher terminal which has requested the transmission of the notification message, store the received identification information of each child and the received notification message, transmit the notification message to a parent terminal pre-registered in such a manner as to be matched to the identification information of each child to give a reception alarm, and insert a connection address of an external apparatus for providing a service, which is stored in relation to a word, in the notification message and transmit the notification message including the connection address when the word of the notification message coincides with a pre-stored word.

In accordance with a second aspect of the present disclosure, there is provided an apparatus for providing an interaction service for children, which includes: a communication interface unit configured to receive at least one child identification information and a notification message from a teacher terminal; and a notification message management unit configured to store the received notification message in association with the received child identification information in a memory when the child identification information and the notification message are received, inquire about a parent terminal matched to the received child identification information, and transmit the notification message in real time to the parent terminal about which the inquiry has been made.

In accordance with a third aspect of the present disclosure, there is provided a teacher terminal, which includes: a communication interface unit configured to communicate with an interaction service providing apparatus; a Near Field Communication (NFC) recognition unit configured to acquire child identification information through tagging an NFC tag which each child carries; a child application execution unit configured to control an operation of an application for integrated management of children, execute the application for the integrated management of the children, and provide a user menu including selection of a target to receive a notification message and input of a notification message; and a control unit configured to transmit child identification information and the input notification message, which are matched to the selected target to receive the notification message, to the apparatus for providing the interaction service, when the target to receive the notification message is selected and the notification message is input.

In accordance with a fourth aspect of the present disclosure, there is provided a parent terminal, which includes: a communication interface unit configured to communicate with an interaction service providing apparatus; and a control unit configured to control a display unit to display an alarm message notifying of existence of received information when a notification message is received through the communication interface unit, and configured to control the display unit to display the notification message when an input corresponding to selection of the notification message is received.

In accordance with a fifth aspect of the present disclosure, there is provided a method for providing an interaction service for children, which includes: selecting a target to receive a notification message through tagging an NFC tag by executing a child application, by a teacher terminal; inputting the notification message by using the child application, and transmitting the input notification message and child identification information acquired through tagging the NFC tag to an interaction service providing apparatus, by the teacher terminal; storing the child identification information in association with the notification message, and transmitting the notification message to a parent terminal matched to the child identification information, by an interaction service providing apparatus; and displaying the notification message on receiving the notification message, by the parent terminal.

In accordance with a sixth aspect of the present disclosure, there is provided a method for providing an interaction service for children by an interaction service providing apparatus, which includes: receiving a notification message and child identification information; inquiring about whether the notification message includes a word pre-stored in association with a connection address of a social commerce service providing apparatus; inserting the connection address of the social commerce service providing apparatus in a partial area of the notification message, when the notification message includes the pre-stored word; inquiring about terminal information of a parent terminal which is matched to the child identification information; and transmitting the notification message including the connection address of the social commerce service providing apparatus, to the parent terminal about which the inquiry has been made.

Advantageous Effects

According to the present disclosure, an interaction service between a teacher and parents is provided, so as to enable comprehensive care through cooperation between an educational institution for children and a family.

Also, according to the present disclosure, the parents can identify, in real time, activities of their child at a kindergarten, a preparation material and the like, so that it is possible to satisfy a desire to know what the activities of their child at the kindergarten are like. In addition, the parents can access a social commerce transmitted together with a notification message to easily purchase the material to be prepared, which provides convenience to the parents.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE PREFERRED EMBODIMENTS

Figure 1:
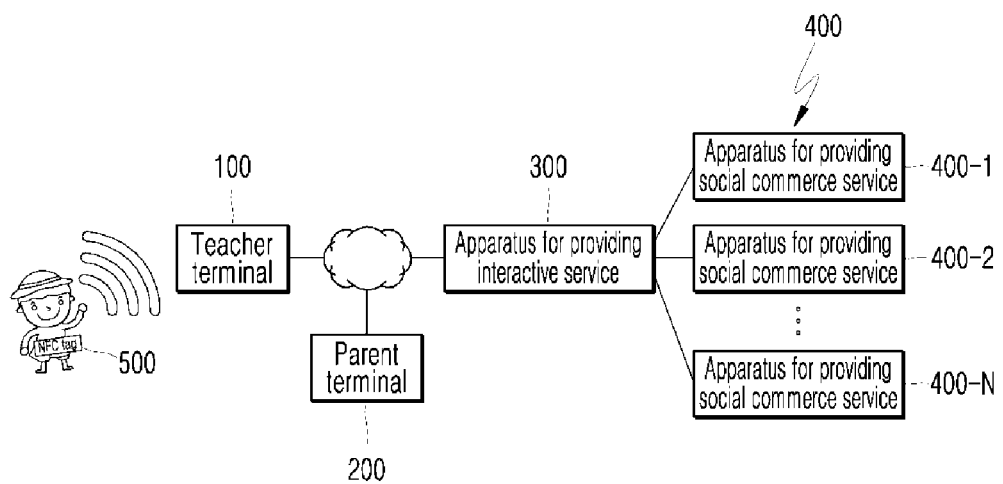
FIG. 1 is a view illustrating a configuration of a network in an interaction service system according to an embodiment of the present disclosure.

Hereinafter, an apparatus and a method for providing an interaction service for children, and a system using the same, according to embodiments of the present disclosure, will be described in more detail with reference to the accompanying drawings. In the following description and drawings, the same reference numerals are used to designate the same or similar components, and so repetition of the description on the same or similar components will be omitted.

FIG. 1 is a view illustrating a configuration of a network in an interaction service system according to an embodiment of the present disclosure.

The interaction service system according to an embodiment of the present disclosure includes a teacher terminal 100, a parent terminal 200, an interaction service providing apparatus 300, and a social commerce service providing apparatus 400.

An application for integrated management of children is installed in each of the teacher terminal 100 and the parent terminal 200, and enables each of the teacher terminal 100 and the parent terminal 200 to use a communication interaction service. As used herein, the term "communication interaction service" refers to interaction for communication which allows a teacher and a child's parent to transmit/receive and identify notification details through the teacher terminal and the parent terminal in real time when there exist the notification details about the child between the teacher and the child's parent.

In order to use the communication interaction service, examples of the teacher terminal 100 and the parent terminal 200, although not limited thereto, may include smart phones, laptop computers, tablet Personal Computers (PCs), computers, and the like. Further, the teacher terminal 100 and the parent terminal 200 may be any devices in which applications can be installed and which enable the transmission and reception of data and integrated management of children by using the installed applications.

Also, the teacher terminal 100 has an application for integrated management of children, which is installed thereon, and may be a dedicated terminal including a reader capable of tagging a Near Field Communication (NFC) tag 500 which stores identification information of each child. The teacher terminal 100 recognizes identification information a child with respect to the NFC tag 500 which has been tagged through the reader, inputs notification details about the relevant child, and provides the notification details to the interaction service providing apparatus 300 or the parent terminal 200.

In an embodiment of the present disclosure, the NFC tag 500 of a child is a code capable of identifying a child, and includes at least one of code information, a child's name, institution information, teacher information, and a parent's telephone number. Particularly, the NFC tag 500 basically includes a child's name and institution information, and a parent's telephone number is separately stored in the interaction service providing apparatus 300, as child information. The teacher information includes personal information of a teacher and terminal information of the teacher terminal 100, and the terminal information of the teacher terminal 100 is a telephone number of the terminal or IDentification (ID) information assigned to each teacher terminal.

Also, the NFC tag 500 of a child sets multiple pieces of information, which is included in the NFC tag 500, so as to be all exposed through first NFC tagging. However, for security, the NFC tag 500 may include encryption information. When the NFC tag 500 includes the encryption information, the teacher terminal 100 identifies only a part of the child information included in the NFC tag 500, and identifies the remaining information through a process in which the encryption is decrypted by the NFC tag 500 and the interaction service providing apparatus 300.

The NFC tag 500 is implemented in the form of a bracelet, a card, a necklace or the like, and is carried by a child who goes to a relevant institution.

The parent terminal 200 is a terminal carried by a child's parent. The parent terminal 200 receives notification details about each child from the teacher terminal 100 or the interaction service providing apparatus 300, and displays and identifies the received notification details. The notification details can be received through a child application installed in the parent terminal 200.

Also, the parent terminal 200 transmits alarm details about the relevant child to the teacher terminal 100 directly or through the interaction service providing apparatus 300, by using the child application.

A communication network serves as an interface for data communication between the teacher terminal 100 and the interaction service providing apparatus 300. Also, the communication network serves as an interface for data communication between the interaction service providing apparatus 300 and the parent terminal 200.

Examples of the communication network may include mobile communication networks of various generations, such as Second Generation (2G), Third Generation (3G), Fourth Generation (4G), Wireless Broadband (WiBro), Worldwide Interoperability for Microwave Access (WI-MAX), and Long Term Evolution (LTE). In addition to the above mobile communication networks, examples of the communication network may include a wired telephone network, a Wireless Local Area Network (WLAN), an Internet network using Wi-Fi, a short-range communication network such as Bluetooth or Zigbee, a near field communication network such as Radio Frequency IDentification (RFID) or Near Field Communication (NFC), and the like.

The interaction service providing apparatus 300 provides an application for integrated management of children to the teacher terminal 100 or the parent terminal 200, and provides interaction services between each child-related institution and parents by using the application.

Specifically, when receiving tagging information of a child and a notification message from the teacher terminal 100, the interaction service providing apparatus 300 according to an embodiment of the present disclosure adds the received notification message to a child management list, inquires about terminal information of a parent terminal matched to the received tagging information, and provides the received notification message to the relevant parent terminal.

Also, when a word of the notification message coincides with a pre-stored word, the interaction service providing apparatus 300 inserts a connection address of an external apparatus for providing a service, which is stored in relation to the word, in the notification message. For example, when the word "box lunch" is included in the notification message, the interaction service providing apparatus 300 inserts access addresses of sites, which specialize in selling children's box lunches, in the notification message, and thereby can provide convenience to the parent who has received the notification message. Accordingly, the parent accesses the box lunch sale site, and orders and pays for a box lunch by using an electronic commerce service.

Also, when receiving the terminal information of the parent terminal and the notification message from the parent terminal 200, the interaction service providing apparatus 300 adds the received notification message to a child management list, inquires about terminal information of a teacher terminal matched to the received terminal information of the parent terminal, and provides the received notification message to the relevant teacher terminal.

As described above, the interaction service system according to an embodiment of the present disclosure performs interaction (particularly, the communication interaction service for the notification message about the child) between the teacher terminal 100 of the child-related institution and the parent terminal 200, via an interaction service providing apparatus 300.

Figure 2:
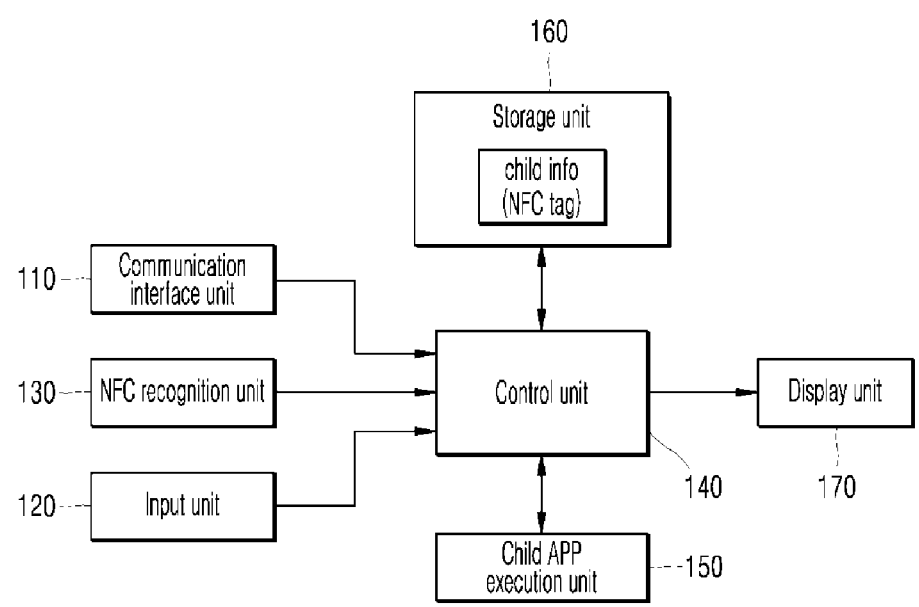
FIG. 2 is a block diagram illustrating a specific configuration of a teacher terminal according to an embodiment of the present disclosure.

FIG. 2 is a block diagram illustrating a specific configuration of a teacher terminal according to an embodiment of the present disclosure.

Referring to FIG. 2, the teacher terminal 100 according to an embodiment of the present disclosure includes a communication interface unit 110, an input unit 120, an NFC recognition unit 130, a control unit 140, a child application execution unit 150, a storage unit 160, and a display unit 170.

The communication interface unit 110 performs data communication between the teacher terminal 100 and the interaction service providing apparatus (denoted by reference numeral 300 in FIG. 1) or the parent terminal (denoted by reference numeral 200 in FIG. 1), through a communication network.

The input unit 120 includes an input means enabling a user's operations such as the input of data, the selection of data, and the like. The input means may include a typical keypad, a typical mouse, and the like. When the display unit 170 is implemented by a touch screen enabling a touch input, the input unit 120 may be implemented as one body with the display unit 170.

The NFC recognition unit 130 recognizes an NFC tag through tagging. In an embodiment of the present disclosure, the NFC recognition unit 130 is applied to the recognition of an NFC tag that a child carries in order to integratedly manage the child.

Also, the NFC recognition unit 130 recognizes the NFC tag through tagging.

The child application execution unit 150 controls an operation of an application for integrated management of children. Particularly, when the input unit 120 requests the execution of an application, the child application execution unit 150 executes a child application, and thereby processes the selection of a menu by each user which includes both the selection of each target of reception of a notification message and the input of a notification message, the input of data by each user, NFC recognition, and the like. Also, the child application execution unit 150 uses the child application to integratedly manage a notification message about each child which is input after NFC tagging of each child. When selecting each target to receive a notification message, the child application execution unit 150 may select the whole class as a reception target by using a menu for selecting the whole class, or may select a reception target through tagging of an NFC tag.

The storage unit 160 stores data required for a child application, and may build a database (DB) by storing information on child-related institutions, child information and a notification messages, as the need arises. The information on the child-related institutions includes names of institutions, information on teacher terminals belonging to institutions, teacher information, and the like. The child information is intended for children who go to the relevant institution, and includes basic information (code information, each child's name, institution information, teacher information, parent information, etc.) including information on an NFC tag of each child.

The display unit 170 displays the child application that the child application execution unit 150 is executing, and visually displays various pieces of information on a communication interaction service.

The control unit 140 controls an overall operation of the teacher terminal 100, and particularly, performs a control operation for interconnecting the child application execution unit 150 to each of the other elements 110, 120, 130 and 170 and performing an operation required for a service.

Specifically, when the execution of the child application is requested through the input unit 120, the control unit 140 requests the child application execution unit 150 to execute the child application. When the child application execution unit 150 executes the child application, the control unit 140 outputs a notification message input window to the display unit 170, and matches a notification message, which is input through the input unit 120, to information on an NFC tag recognized by the NFC recognition unit 130 and records the notification message in a child management list.

Then, the control unit 140 controls the communication interface unit 110 to transmit the information on the NFC tag, which the NFC recognition unit 130 has tagged, and the notification message, which has been input through the input unit 120, to an external interaction service providing apparatus.

The teacher terminal 100 as configured above acquires identification information of a child through NFC tagging, inputs and manages a notification message about the relevant child, and shares the notification message with the relevant child's parent.

Figure 3:
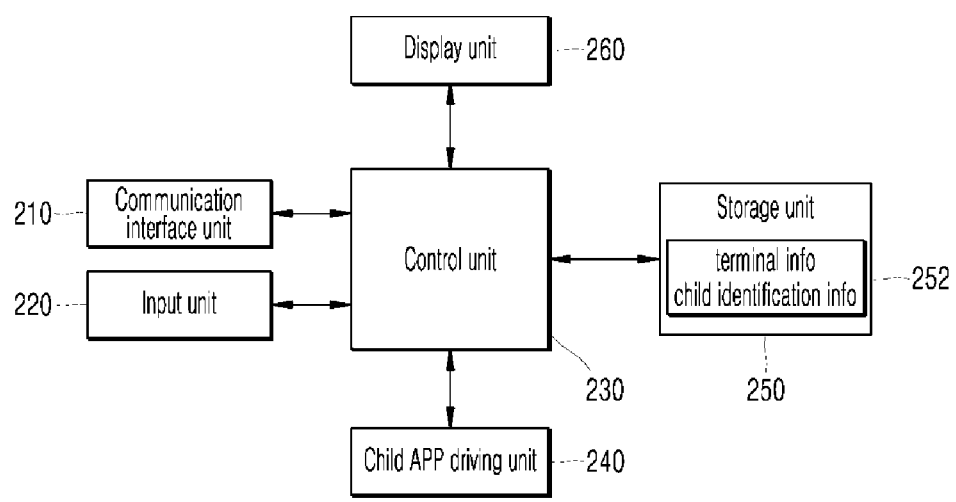
FIG. 3 is a block diagram illustrating a specific configuration of a parent terminal according to an embodiment of the present disclosure.

FIG. 3 is a block diagram illustrating a specific configuration of a parent terminal according to an embodiment of the present disclosure.

Referring to FIG. 3, the parent terminal 200 according to an embodiment of the present disclosure includes a communication interface unit 210, an input unit 220, a control unit 230, a child application driving unit 240, a storage unit 250, and a display unit 260.

The communication interface unit 210 performs data communication between the parent terminal 200 and the interaction service providing apparatus (denoted by reference numeral 300 in FIG. 1) through a communication network.

The input unit 220 includes an input means enabling a user's operations such as the input of data, the selection of data, and the like. The input means may include a typical keypad, a typical mouse, and the like. When the display unit 260 is implemented by a touch screen enabling a touch input, the input unit 220 may be implemented as one body with the display unit 260.

The child application driving unit 240 controls an operation of an application for integrated management of children. Particularly, when the input unit 220 requests the execution of an application, the child application driving unit 240 executes a child application, and thereby processes the selection of a menu by each user, the input of data by each user, the transmission of a message, and the like, by using the child application that the child application driving unit 240 is executing. Also, the child application driving unit 240 uses the child application to integratedly manage transmitted and received notification messages about children.

The storage unit 250 stores data required for a child application and terminal information. As the need arises, the storage unit 250 may store child information. The child information includes each child's name, institution information, teacher information, and the like.

The display unit 260 displays the child application that the child application driving unit 240 is executing, and visually displays various pieces of information on a communication interaction service.

The control unit 230 controls an overall operation of the parent terminal 200, and particularly, performs a control operation for interconnecting the child application driving unit 240 to each of the other elements 210, 220, 240, 250 and 260 and performing an operation required for a service.

When the execution of the child application is requested through the input unit 220, the control unit 230 requests the child application driving unit 240 to execute the child application. When the child application driving unit 240 executes the child application, the control unit 230 outputs a notification message input window to the display unit 260, and transmits a notification message, which is input through the input unit 220, together with identification information of each child, which is stored in the storage unit 250, to an external interaction service providing apparatus through the communication interface unit 210.

Also, when a notification message is received through the communication interface unit 210, the control unit 230 controls the display unit 260 to display the reception of the notification message. When viewing of a message is selected through the input unit 220, the control unit 230 requests the child application driving unit 240 to execute a child application. When the child application driving unit 240 executes the child application, the control unit 230 controls the display unit 260 to display the contents of the notification message.

When the notification message includes a connection address of the social commerce service providing apparatus, if the connection address is selected, the control unit 140 controls the communication interface unit 110 to connect the parent terminal 200 to the social commerce service providing apparatus which has the connection address, and provides an electronic commerce service to the user through the connected social commerce service providing apparatus. The parent terminal 200 as configured above connects to the social commerce service providing apparatus, and thereby enables the easy purchase of a preparation material.

As described above, the parent terminal 200 according to an embodiment of the present disclosure has a configuration of connecting to the interaction service providing apparatus (denoted by reference numeral 300 in FIG. 1) before managing a notification message about each child and transmitting/receiving a notification message to the teacher terminal (denoted by reference numeral 100 in FIG. 1) via the connected interaction service providing apparatus (denoted by reference numeral 300 in FIG. 1).

Figure 4:
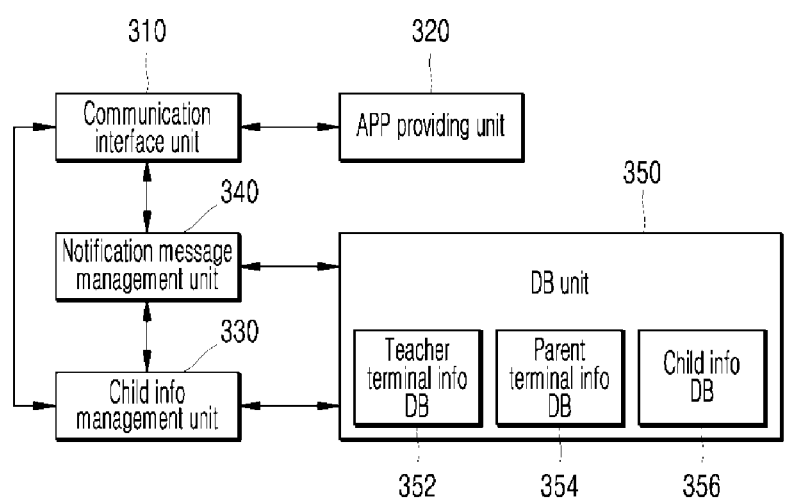
FIG. 4 is a block diagram illustrating a specific configuration of an interaction service providing apparatus according to an embodiment of the present disclosure.

FIG. 4 is a block diagram illustrating a specific configuration of an interaction service providing apparatus according to an embodiment of the present disclosure.

Referring to FIG. 4, the interaction service providing apparatus 300 includes a communication interface unit 310, an application providing unit 320, a child information management unit 330, a notification message management unit 340, and a DB unit 350.

The communication interface unit 310 performs data communication between a teacher terminal of a child-related institution and a parent terminal.

The application providing unit 320 provides an application for integrated management of children to the teacher terminal or the parent terminal, which connects to the interaction service providing apparatus 300, through the communication interface unit 310. The application providing unit 320 performs functions of managing an application, such as the installation, update, deletion and the like of the application.

The child information management unit 330 stores both identification information of each child, and child information, information on child-related institutions (including educational institutions and child-care institutions), terminal information of each teacher terminal, information on each child's parent and terminal information of each parent terminal, which are other than a notification message and are transmitted through the communication interface unit 310, in the DB unit 350 in such a manner as to associate the child information, the information on child-related institutions, the terminal information of each teacher terminal, the information on each child's parent and the terminal information of each parent terminal with the identification information of each child. Also, the child information management unit 330 deletes or updates the information stored in the DB unit 350. Also, the child information management unit 330 assigns a unique ID to each of teacher terminals and parent terminals which have previously been registered, and manages each of the teacher terminals and the parent terminals based on the ID information.

The DB unit 350 includes a child application to be transmitted to each client terminal, identification information of each child and each notification message received through a communication interface, child information including a notification message, information on child-related institutions, a teacher terminal information DB 352, a parent terminal information DB 354, and a child information DB 356 which stores information on each child including information on each NFC tag and each notification message.

When receiving terminal information on a transmission terminal information, identification information of a child and a notification message through the communication interface unit 310, the notification message management unit 340 inquires about terminal information on a reception terminal matched to the received identification information of the child, and transmits the notification message to the reception terminal by using the terminal information on the reception terminal about which the notification message management unit 340 has inquired.

According to circumstances, when an word included in the notification message coincides with a pre-stored word, the notification message management unit 340 may insert a Uniform Resource Locator (URL) access address of the social commerce service providing apparatus, which has been stored in association with the word, in a partial area of the notification message. As described above, the parent who has received the notification message, can easily purchase a preparation material and the like, which are associated with the notification message, or can obtain information related to the notification message.

When receiving information on an NFC tag and a notification message from the teacher terminal 100 or the parent terminal 200 through the communication interface unit 310, the notification message management unit 340 stores the notification message in a child information management list matched to the information on the NFC tag, and stores a transmission log or a reception log.

Then, the notification message management unit 340 refers to the parent terminal information DB 354 for parent information matched to the information on the NFC tag which has been transmitted together with the notification message, and transmits the notification message to the relevant parent terminal. In an embodiment of the present disclosure, the notification message management unit 340 first transmits an alarm message notifying of the existence of the notification message to the parent terminal. When a request for identifying the details of the transmitted alarm message is received from the parent terminal, the notification message management unit 340 transmits the detailed information (i.e., the notification message about the relevant child) to the parent terminal.

The parent information may be a telephone number of the parent terminal, or may be a management ID number which has previously been registered and is assigned. Accordingly, when transmitting data, the notification message management unit 340 transmits the data based on an ID, so that it is possible to prevent concern over the exposure of a personal telephone number of the parent terminal.

Also, when receiving terminal information of the parent terminal and the notification message from the parent terminal 200 through the communication interface unit 310, the notification message management unit 340 searches for information on an NFC tag and terminal information of a teacher terminal, which are matched to the terminal information of the parent terminal, and stores the notification message in a relevant child information management list. Then, the notification message management unit 340 transmits the information on the NFC tag and the notification message to the teacher terminal. In an embodiment of the present disclosure, as in a method for transmitting a notification message to the parent terminal, the notification message management unit 340 first transmits an alarm message notifying of the reception of the notification message to the teacher terminal. When a request for identifying the details of the transmitted alarm message is received from the teacher terminal, the notification message management unit 340 transmits the detailed information (i.e., the notification message about the relevant child) to the teacher terminal.

Figure 5:
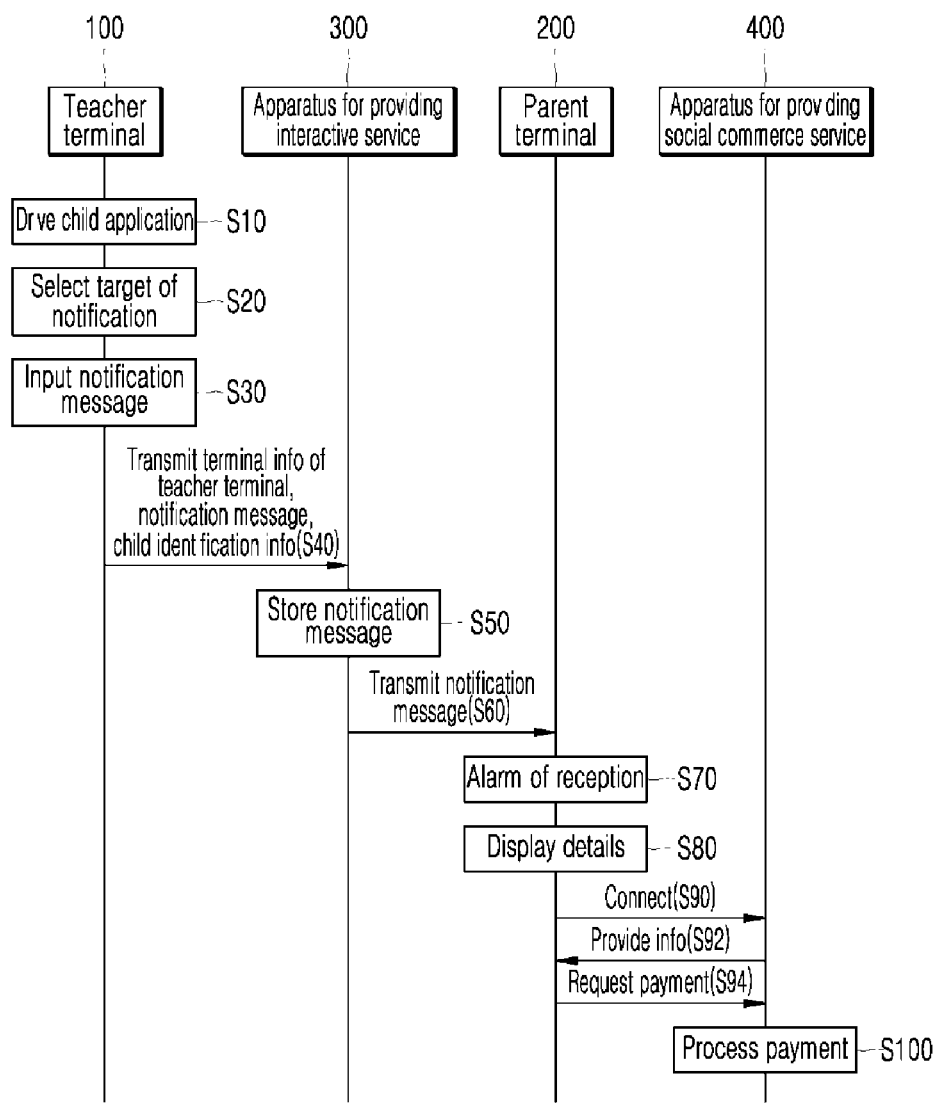
FIG. 5 is a signal flow diagram illustrating a method for providing an interaction service for children according to an embodiment of the present disclosure.

FIG. 5 is a signal flow diagram illustrating a method for providing a smart interaction service for communication according to an embodiment of the present disclosure.

After a teacher causes the teacher terminal 100 to execute a child application installed in the teacher terminal 100, the teacher selects a target of notification, in steps S10 and S20. When selecting a target of notification, the teacher may select a whole class or a particular child through a menu. When the teacher selects the particular child, the teacher tags an NFC tag, which the particular child carries, by using the teacher terminal. The teacher terminal 100 acquires identification information of the particular child through tagging. In an embodiment of the present disclosure, when the identification information acquired through NFC tagging is encrypted information, the teacher terminal 100 decrypts the encrypted information by using a decryption key stored in the child application, acquires the decrypted identification information of the particular child, and drives the child application. In contrast, when the relevant teacher terminal 100 does not pre-store a decryption key, the teacher terminal 100 transmits the encrypted information to the interaction service providing apparatus 300, and requests the interaction service providing apparatus 300 to decrypt the encrypted information. Then, the teacher terminal 100 receives the decrypted identification information of the particular child from the interaction service providing apparatus 300, and uses the decrypted identification information of the particular child.

Figure 6:
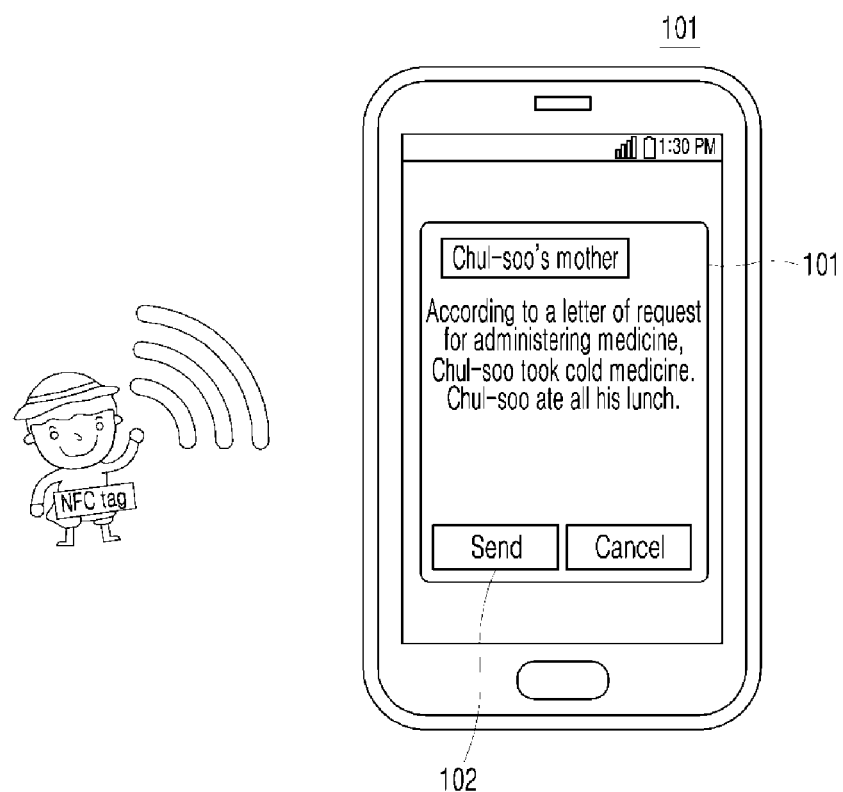
FIG. 6 is a view illustrating an example of a screen of a teacher terminal in a case where the teacher terminal transmits a notification message, according to an embodiment of the present disclosure.

When selecting the target of notification, the teacher terminal 100 displays a notification message window and receives, as input, notification details which are to be entered into a notification message, in step S30. Specifically, when the teacher terminal 100 selects the whole class or tags the NFC tag, the teacher terminal 100 displays a notification message input window as illustrated in FIG. 6. Next, when a notification message is input through the relevant notification message input window 101 and a send button 102 is selected, the teacher terminal 100 transmits the notification message to the parent terminal 200 via the interaction service providing apparatus 300.

In step S40, the teacher terminal 100 transmits terminal information of the teacher terminal 100, the notification message and the identification information of the particular child to the interaction service providing apparatus 300.

In step S50, the interaction service providing apparatus 300 receives and stores the identification information of the particular child and the notification message from the teacher terminal 100. In step S60, the interaction service providing apparatus 300 transmits the notification message to the parent terminal 200 pre-stored in such a manner as to be matched to the identification information. At this time, the interaction service providing apparatus 300 identifies whether the message includes a particular word. For example, when the word "box lunch" is stored in the interaction service providing apparatus 300 in such a manner that the word "box lunch" is associated with access addresses of sites which sell box lunches, if the interaction service providing apparatus 300 determines whether the notification message includes the word "box lunch" and determines that the notification message includes the word "box lunch," the interaction service providing apparatus 300 inserts the access addresses of the sites, which sell box lunches, in a partial area of the notification message and transmits the notification message including the access addresses of the sites.

Figure 7:
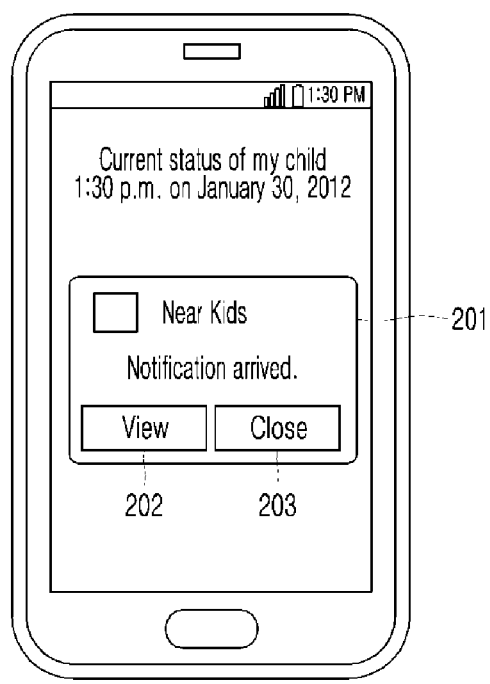
FIG. 7 is a view illustrating an example of a screen of a parent terminal in a case where the parent terminal receives an alarm message, according to an embodiment of the present disclosure.

When the notification message is received, the parent terminal 200 first gives an alarm about the reception of the notification message in step S70, and displays the notification message in step S80. More specifically, when receiving the notification message via the interaction service providing apparatus, the parent terminal 200 displays the reception of information, and provides an alarm message notifying of the existence of the received information. When the notification message is selected, the parent terminal 200 provides the notification message. As illustrated in FIG. 7, the alarm message may be provided in the form of a pop-up window 201, and notifies of the reception of the notification message from the teacher by displaying "Near Kids: a notification arrived."

In an embodiment of the present disclosure, a view button 202 enabling a detailed view of the alarm message 201, a close button for terminating the display of the alarm message, and the like are displayed on the screen. When an input corresponding to the selection of the view button 202 is received, a child application is activated, and the parent terminal 200 enables the view of the notification message, which has been received via the interaction service providing apparatus, by using the child application.

Figure 8:
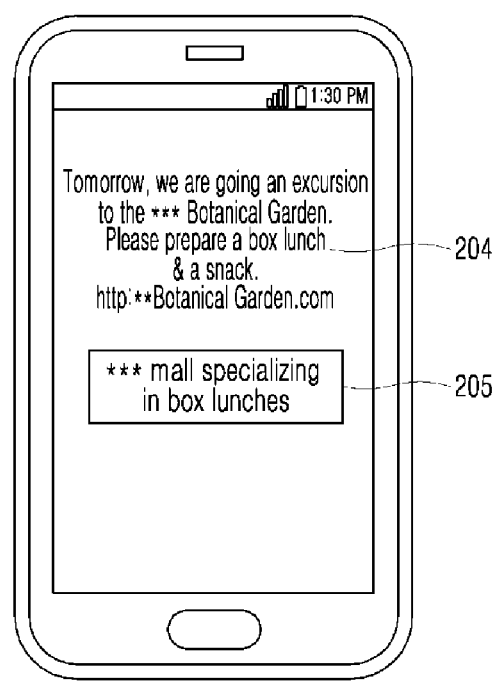
FIG. 8 is a view illustrating an example of a screen of a parent terminal on which a notification message is displayed, according to an embodiment of the present disclosure.

FIG. 8 is a view illustrating an example of a screen of a parent terminal on which a notification message is displayed, according to an embodiment of the present disclosure.

When, as illustrated in FIG. 8, a connection address 205 of the social commerce service providing apparatus 400 is included within a partial area of the notification message displayed in a display window, if the parent selects the connection address 205, the parent terminal 200 connects to the social commerce service providing apparatus 400 which has the connection address, and receives a service from the social commerce service providing apparatus 400, in steps S90 to S100. For example, when a preparation material is a box lunch as illustrated in FIG. 8, the parent selects an access address of an on-line shopping mall which specializes in selling box lunches, accesses the on-line shopping mall which specializes in selling box lunches, and orders and pays for a desired box lunch through electronic commerce. Such a payment method for electronic commerce corresponds to the prior art, and thus a detailed description thereof will be omitted.

Meanwhile, according to embodiments of the present disclosure, the method for providing an interaction service in the teacher terminal may be implemented by a software program, and may be recorded in a predetermined computer-readable recording medium.

A computer-readable recording medium suitable for storing computer program instructions and data may store computer program instructions and data for executing: executing, by the teacher terminal, a child application corresponding to a program for the method for providing an interaction service; tagging an NFC tag that each child carries and acquiring identification information of each child, by the teacher terminal; providing, by the teacher terminal, a user menu including an input of a notification message, when the identification information of each child has been acquired; and transmitting, by the teacher terminal, an input notification message and the identification information of each child to the interaction service providing apparatus, when the notification message is input.

Examples of the computer-readable recording medium suitable for storing computer program instructions and data may include all forms of non-volatile memory, medium and memory device, in which examples of non-volatile memory include semiconductor memory devices, such as an Erasable Programmable Read-Only Memory (EPROM), an Electrically EPROM (EEPROM) and flash memory devices; magnetic disks, such as internal hard disks and removable disks; magneto-optical disks; and a Compact Disc-Read Only Memory (CD-ROM) and a Digital Versatile Disc-ROM (DVD-ROM). The processor and the memory may be supplemented by, or integrated into a special-purpose logic circuit.

The functional operations and implementations which are described in the specification of the present disclosure may be implemented in digital electronic circuitry, or in computer hardware, firmware, software, or in combinations thereof. The implementations described in the specification of the present disclosure may be implemented as one or more computer program products, i.e., as one or more modules of computer program instructions encoded on a tangible program storage medium in order to control an operation of a data processing apparatus or for execution by the data processing apparatus.

Although operations are depicted in the drawings of the present disclosure in a particular order, this should not be understood as requiring that such operations be performed in the particular order shown or in sequential order, or that all illustrated operations be performed, to achieve desirable results. In certain circumstances, multitasking and parallel processing may be advantageous.

Also, particular implementations of the subject matter described in this specification have been described. Other implementations are within the scope of the following claims. For example, the actions recited in the claims can be performed in a different order and still achieve desirable results, unless expressly noted otherwise.

Although exemplary embodiments of the present disclosure have been described as shown above, it will be understood that various modifications and variations can be made by those skilled in the art to which the present disclosure pertains without departing from the spirit and scope of the present disclosure described in the below claims.

What is claimed is:

1. An apparatus for providing an interaction service for children, the apparatus comprising:
   a communication interface unit configured to receive, from a teacher terminal, at least one child identification information and a notification message; and
   a notification message management unit configured to
      store the received notification message in association with the received child identification information in a memory,
      determine a parent terminal matched to the received child identification information,
      determine whether the received notification message includes a predetermined word stored in association with an Uniform Resource Locator (URL) access address of an external apparatus for providing a service, and
      transmit the received notification message to the matched parent terminal,
   wherein, when the predetermined word is included in the received notification messages, the notification message management unit is configured to
      add the URL access address of the external apparatus for providing the service associated with the predetermined word, to the received notification message, and
      transmit the received notification message with the added URL access address to the matched parent terminal.

2. The apparatus as claimed in claim 1, further comprising:
   an application providing unit configured to provide a child application to the teacher terminal; and
   a child information management unit configured to
      store child information, information on child-related institutions, terminal information of each teacher terminal, information on each child's parent, and terminal information of each parent terminal, which are other than a notification message transmitted through the communication interface unit, in association with the child identification information in the memory, and
      delete or update the stored information.

3. The apparatus as claimed in claim 1, wherein the external apparatus for providing the service comprises at least one of:
   a social commerce service providing apparatus,
   a hands-on class service providing apparatus, and
   a homepage service providing apparatus for information on field trip places.

4. A terminal, comprising:
   a communication interface unit configured to communicate with an interaction service providing apparatus;
   a Near Field Communication (NFC) recognition unit configured to acquire child identification information through tagging NFC tags each of which is carried by a child among a plurality of children;
   a child application execution unit configured to
      control an operation of an application for integrated management of the plurality of children,
      execute the application for the integrated management of the plurality of children,
      provide a user menu including selection of a target to receive a notification message and input of the notification message, and
      select the target to receive the notification message through tagging the NFC tags; and
   a control unit configured to transmit child identification information and the input notification message, which are matched to the selected target to receive the notification message, to the interaction service providing apparatus, when the target to receive the notification message is selected and the notification message is input.

5. The terminal as claimed in claim 4, further comprising:
   a display unit configured to display the user menu including the selection of the target to receive the notification message and the input of the notification message, which are provided by the child application execution unit; and
   an input unit configured to select the target to receive the notification message or input the notification message.

6. The terminal as claimed in claim 4, wherein the child application execution unit is configured to further perform a function of decrypting encrypted information, when the information which the NFC recognition unit has acquired through tagging corresponds to the encrypted information.

7. The terminal as claimed in claim 4, wherein the child application execution unit is configured to select a whole class of the plurality of children as the target to receive the notification message.

8. A method for providing an interaction service for children, the method comprising:

selecting, by a teacher terminal, a target to receive a notification message through tagging an Near Field Communication (NFC) tag by executing a child application;

inputting, by a teacher terminal, the notification message by using the executed child application;

transmitting, by the teacher terminal, the input notification message and child identification information of the selected target to an interaction service providing apparatus;

receiving, by the interaction service providing apparatus, the transmitted child identification information and the transmitted notification message;

storing, by the interaction service providing apparatus, the received child identification information in association with the received notification message;

determining, by the interaction service providing apparatus, whether the received notification message includes a predetermined word stored in association with an Uniform Resource Locator (URL) access address of an external apparatus for providing a service;

transmitting, by the interaction service providing apparatus, the received notification message to a parent terminal matched to the received child identification information; and receiving, by the matched parent terminal, the transmitted notification message, and displaying, by the matched parent terminal, the received notification message, wherein, when the predetermined word is included in the received notification messages, the interaction service providing apparatus is configured to add the URL access address of the external apparatus for providing the service associated with the predetermined word, to the received notification message, and transmit the received notification message with the added URL access address to the matched parent terminal.

9. The method as claimed in claim 8, wherein the transmitting, by the teacher terminal, the input notification message and the child identification information acquired through tagging the NFC tags to the interaction service providing apparatus comprises decrypting, by the teacher terminal, encrypted information by using a pre-stored decryption key when the child identification information acquired through tagging the NFC tags is encrypted.

10. The method as claimed in claim 8, wherein the transmitting, by the teacher terminal, the input notification message and the child identification information acquired through tagging the NFC tags to the interaction service providing apparatus comprises:

when the child identification information is encrypted during tagging the NFC tags and the teacher terminal does not have a decryption key, transmitting, by the teacher terminal, encrypted child identification information and sending, by the teacher terminal, a request for decrypting the encrypted child identification information to the interaction service providing apparatus; and receiving, by the teacher terminal, decrypted child identification information from the interaction service providing apparatus.

11. The method as claimed in claim 8, wherein the selecting, by a teacher terminal, the target to receive the notification message comprises when the teacher terminal selects a whole class as the target to receive the notification message, selecting the target to receive the notification message through selection of a menu without tagging the NFC tags, by the teacher terminal.

12. The method as claimed in claim 8, wherein the displaying, by the matched parent terminal, the received notification message further comprises:

when the transmitted notification message is received, displaying, by the matched parent terminal, a reception alarm; and when an input corresponding to identification of the reception alarm is received, displaying, by the matched parent terminal, the notification message.

13. The method as claimed in claim 12, wherein, the displaying, by the matched parent terminal, the received notification message comprises:

when the received notification message includes the URL access address of the external apparatus for providing the service, accessing, by the matched parent terminal, to the URL access address corresponding to selection of the URL access address.

14. A method for providing an interaction service, the method performed by a processor of an interaction service providing apparatus, the method comprising:

receiving a notification message and child identification information;

determining whether the received notification message includes a predetermined word pre-stored in association with a connection address of a social commerce service providing apparatus;

when the predetermined word is included in the received notification message, adding the connection address of the social commerce service providing apparatus in a partial area of the notification message, determining a parent terminal which is matched to the received child identification information; and transmitting the received notification message including the added connection address of the social commerce service providing apparatus, to the matched parent terminal.

15. A non-transitory computer-readable recording medium storing a program for executing the method for providing the interaction service as claimed in claim 14.

16. An interaction service system for children, the interaction service system comprising:

a teacher terminal configured to acquire identification information of each child by reading a Near Field Communication (NFC) tag which each child carries, receive a notification message as an input, store the received notification message in association with the acquired identification information of each child, and request transmission of the input notification message in association with the acquired identification information;

a parent terminal configured to receive the input notification message in association with the acquired identification information, and display the received notification message; and an interaction service providing apparatus configured to receive the identification information of each child and the notification message in association with the acquired identification information, from the teacher terminal, store the received identification information of each child and the received notification message in association with the acquired identification information, determine whether a word of the notification message coincides with a pre-stored word, when no word of the notification message coincides with the pre-stored word, transmit the notification message in association with the acquired identification information to a parent terminal pre-registered in such a manner as to be matched to the identification information of each child to give a reception alarm, and when the word of the notification message coincides with the pre-stored word, insert a connection address of an external apparatus for providing a service, which is stored in relation to the pre-stored word, in the notification message, and transmit the notification message including the inserted connection address to the parent terminal matched to the acquired identification information.

* * * * *